US008897762B2

(12) United States Patent
Cherian et al.

(10) Patent No.: US 8,897,762 B2
(45) Date of Patent: Nov. 25, 2014

(54) OPTIMIZING SIGNALING LOAD OVERHEAD AND BATTERY CONSUMPTION FOR BACKGROUND APPLICATIONS

(75) Inventors: George Cherian, San Diego, CA (US);
Rashid A. Attar, San Diego, CA (US);
Donna Ghosh, San Diego, CA (US);
Linhai He, San Diego, CA (US);
Rashmi Keshava Iyengar, San Diego, CA (US); Christopher Lott, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/407,479

(22) Filed: Feb. 28, 2012

(65) Prior Publication Data

US 2013/0225145 A1   Aug. 29, 2013

(51) Int. Cl.
*H04W 48/02* (2009.01)
*H04W 52/02* (2009.01)

(52) U.S. Cl.
CPC ...... *H04W 52/0264* (2013.01); *H04W 52/0261* (2013.01)
USPC ............................ 455/418; 455/419; 455/405

(58) Field of Classification Search
CPC ....................... H04W 52/0264; H04W 52/0261
USPC .......................................... 455/418, 419, 405
See application file for complete search history.

(56) References Cited

U.S. PATENT DOCUMENTS

| 8,015,249 | B2 * | 9/2011 | Nayak et al. .................. 709/206 |
| 2004/0189712 | A1 * | 9/2004 | Rundell ........................ 345/808 |
| 2005/0026654 | A1 * | 2/2005 | Perez et al. ............... 455/556.2 |
| 2005/0136882 | A1 * | 6/2005 | Boulton ..................... 455/343.4 |
| 2008/0084977 | A1 * | 4/2008 | Nayak et al. .................. 379/130 |
| 2009/0011791 | A1 * | 1/2009 | Tashiro ..................... 455/550.1 |
| 2010/0120477 | A1 | 5/2010 | Imai |
| 2010/0223328 | A1 | 9/2010 | Haataja et al. |
| 2011/0153728 | A1 | 6/2011 | Einarsson et al. |
| 2011/0185202 | A1 | 7/2011 | Black et al. |
| 2012/0108225 | A1 * | 5/2012 | Luna et al. .................... 455/418 |
| 2013/0010693 | A1 * | 1/2013 | Luna et al. .................... 370/328 |

FOREIGN PATENT DOCUMENTS

| EP | 1993273 A1 | 11/2008 |
| WO | 2009070415 A1 | 6/2009 |

OTHER PUBLICATIONS

International Search Report and Written Opinion—PCT/US2013/028061—ISA/EPO—Jun. 24, 2013.

* cited by examiner

*Primary Examiner* — Khai M Nguyen
(74) *Attorney, Agent, or Firm* — Raphael Freiwirth

(57) ABSTRACT

The disclosure relates to managing applications configured for execution on a mobile device. An embodiment of the disclosure receives one or more network access requests from one or more applications executing on the mobile device, determines that the mobile device is operating in a background mode, suppresses transmission to a network of the one or more network access requests to a network based on the determination, and transmits a subset of the one or more network access requests upon transition out of the background mode.

29 Claims, 15 Drawing Sheets

OPTIMIZING SIGNALING LOAD OVERHEAD AND BATTERY CONSUMPTION FOR BACKGROUND APPLICATIONS

FIELD OF DISCLOSURE

Embodiments of the invention relate to optimizing signaling load overhead and battery consumption for background applications.

BACKGROUND

Wireless communication systems have developed through various generations, including a first-generation analog wireless phone service (1G), a second-generation (2G) digital wireless phone service (including interim 2.5G and 2.75G networks) and a third-generation (3G) high speed data, Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

Mobile devices, such as "Smartphones," tablets, laptops, etc., may have several applications ("apps") running simultaneously that need to update dynamically (e.g. Twitter®, Facebook®, Yahoo! Finance®, etc.). Each application updates its content periodically based on its own implementation-specific timing. These updates are performed even though the updated content may not be used by the user immediately. Further, these updates are not coordinated across the applications, leading to more frequent radio connections, which results in increased signaling load and/or battery consumption.

SUMMARY

The disclosure relates to managing applications configured for execution on a mobile device. An embodiment of the disclosure receives one or more network access requests from one or more applications executing on the mobile device, determines that the mobile device is operating in a background mode, suppresses transmission to a network of the one or more network access requests to a network based on the determination, and transmits a subset of the one or more network access requests upon transition out of the background mode.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
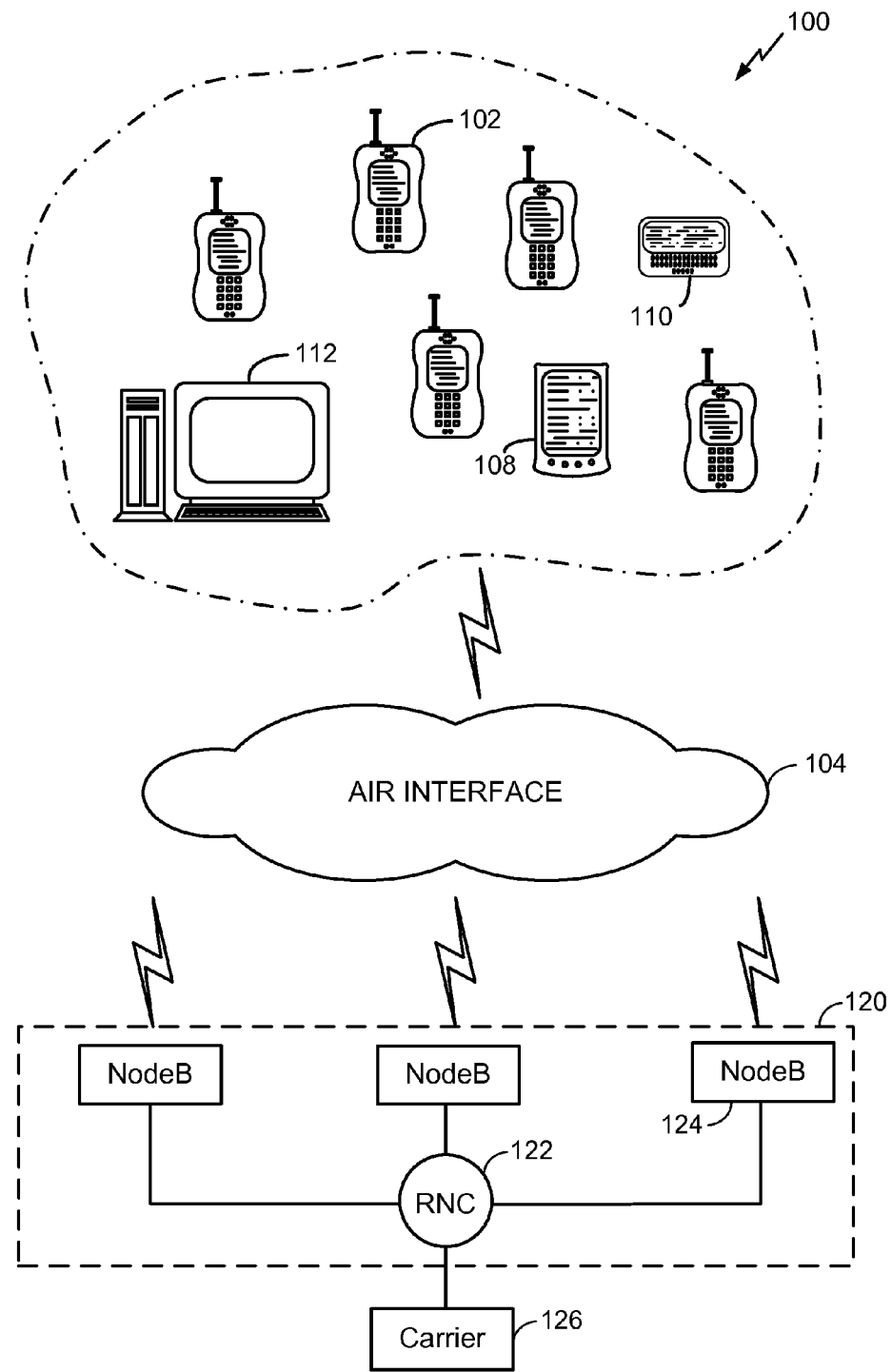
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action. (e.g., described in more detail below with respect to FIG. 4).

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the UE 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of UE including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal," "AT," "wireless device," "client device," "mobile terminal," "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2:
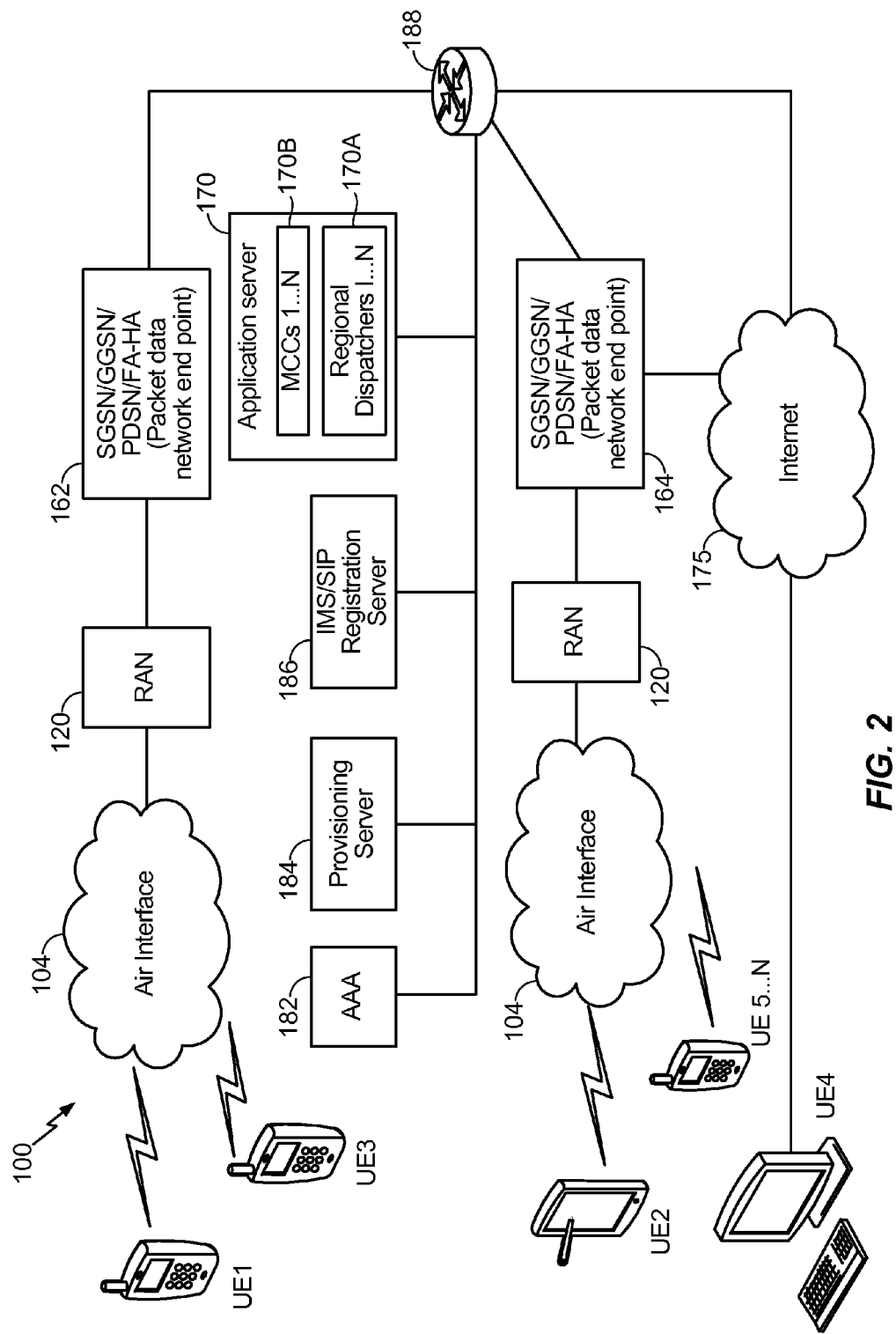
FIG. 2 illustrates an example of the wireless communications system of FIG. 1 in more detail.

FIG. 2 illustrates an example of the wireless communications system 100 of FIG. 1 in more detail. In particular, referring to FIG. 2, UEs 1 ... N are shown as connecting to the RAN 120 at locations serviced by different packet data network end-points. The illustration of FIG. 2 is specific to W-CDMA systems and terminology, although it will be appreciated how FIG. 2 could be modified to conform with various other wireless communications protocols (e.g., LTE, EV-DO, UMTS, etc.) and the various embodiments are not limited to the illustrated system or elements.

UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2, UEs 1, 3 and 4 . . . N are illustrated as wireless cell-phones, UE 2 is illustrated as a wireless tablet-and/or laptop PC However, in other embodiments, it will be appreciated that the wireless communication system 100 can connect to any type of UE, and the examples illustrated in FIG. 2 are not intended to limit the types of UEs that may be implemented within the system.

Figure 3:
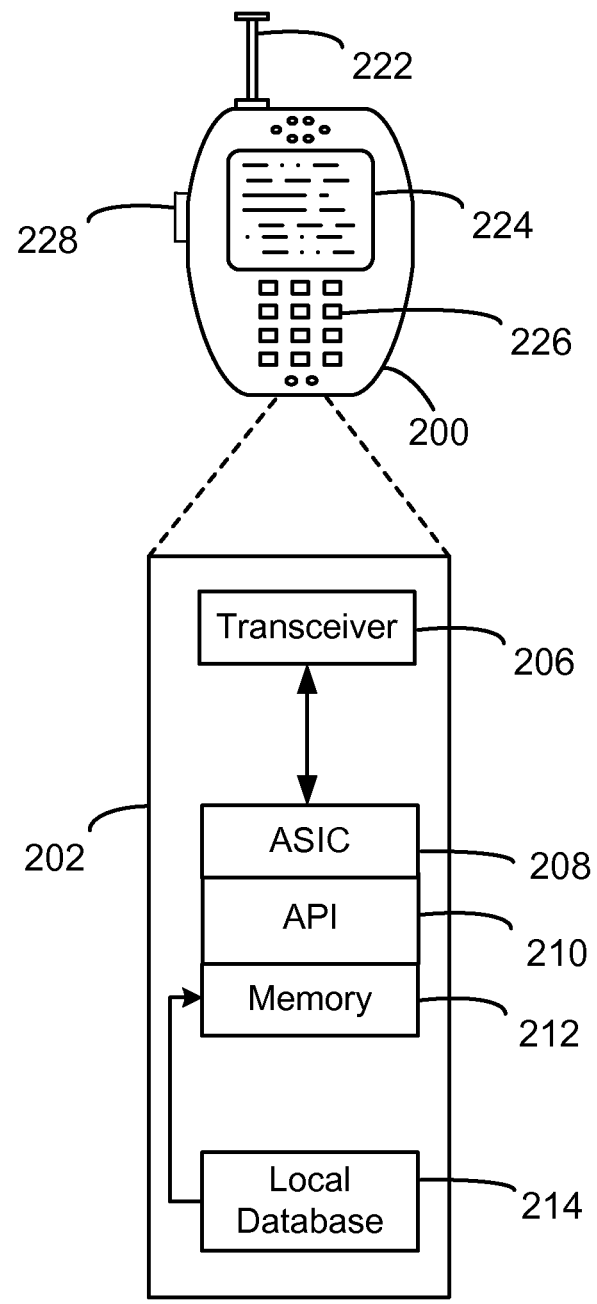
FIG. 3 illustrates a user equipment (UE) in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), 3GPP Long Term Evolution (LTE), or other protocols that may be used in a wireless communications network or a data communications network. Accordingly, the illustrations provided herein are not intended to limit the embodiments of the invention and are merely to aid in the description of aspects of embodiments of the invention.

Figure 4:
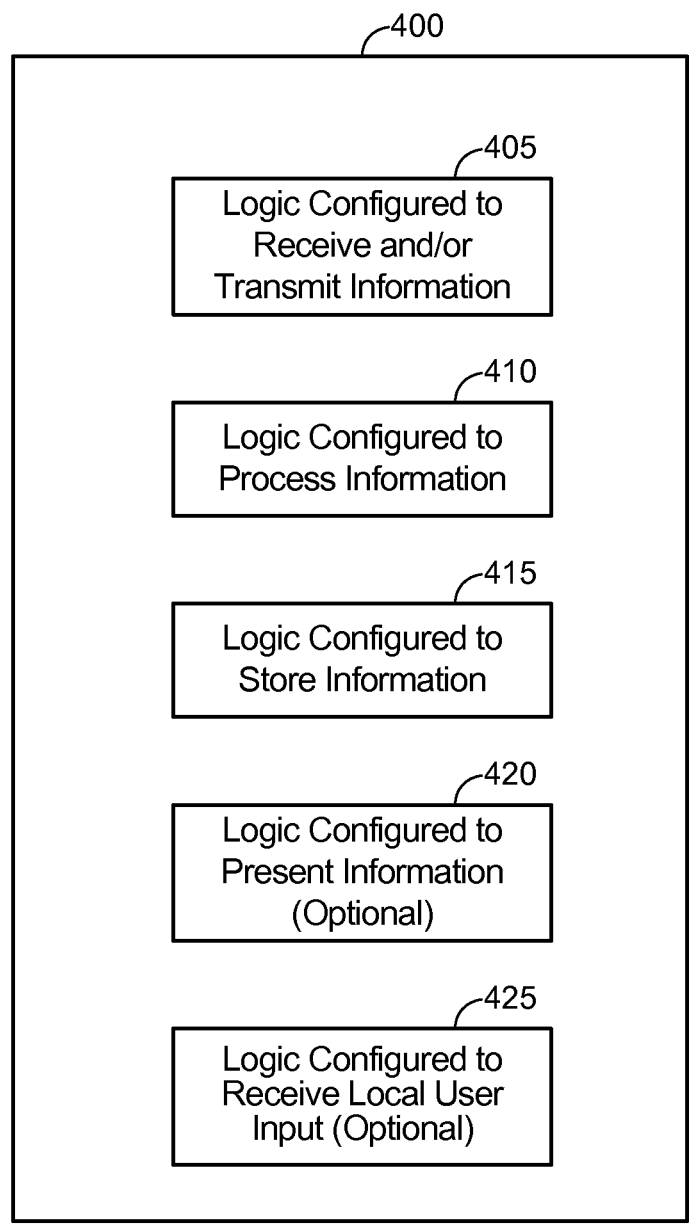
FIG. 4 illustrates a communication device that includes logic configured to perform functionality.

FIG. 4 illustrates a communication device 400 that includes logic configured to perform functionality. The communication device 400 can correspond to any of the above-noted communication devices, including but not limited to UEs 102, 108, 110, 112 or 200, Node Bs or base stations 120, the RNC or base station controller 122, a packet data network end-point (e.g., SGSN 160, GGSN 165, a Mobility Management Entity (MME) in Long Term Evolution (LTE), etc.), any of the servers 170 through 186, etc. Thus, communication device 400 can correspond to any electronic device that is configured to communicate with (or facilitate communication with) one or more other entities over a network.

Referring to FIG. 4, the communication device 400 includes logic configured to receive and/or transmit information 405. In an example, if the communication device 400 corresponds to a wireless communications device (e.g., UE 200, Node B 124, etc.), the logic configured to receive and/or transmit information 405 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., SGSN 160, GGSN 165, application server 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to display information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 200 as shown in FIG. 3, the logic configured to present information 420 can include the display 224. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 200 as shown in FIG. 3, the logic configured to receive local user input 425 can include the display 224 (if implemented a touch-screen), keypad 226, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 405. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

It will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

A mobile device may have three types of applications that require periodic updates. The first type of application uses application-initiated update sessions, i.e. "pull" services. Examples include Facebook®, Twitter®, Yahoo! Finance®, etc. The second type of application has network-initiated update sessions, i.e. "push" services. An example would be an email service. The third type of application must update at periodic intervals because the network expects it to, i.e. "keep-alive" services. An example would be an instant messaging application. Standby time enhancements for the first type of application can be device-based, while enhancements for the other two types of applications may benefit from network assistance.

An embodiment of the invention defines a background mode and a non-background mode for a mobile device, and defines a new behavior for a mobile device operating in background mode that reduces signaling load overhead and battery consumption by synchronizing application updates.

A mobile device enters "background mode" when there has been no modem data activity for a predefined duration of time, no user interaction (e.g. no key-presses, the display is off, the camera is off, etc.) for a predefined period of time, and the mobile device is not in "tethered" mode (i.e. not connected to an external device such as a laptop). The mobile device may determine that it may enter background mode by determining that there was no peripheral access (e.g. from the keypad, display, accessories, etc.) and no data activity for a certain period of time. If the mobile device is not in background mode, it is in foreground mode.

When the mobile device is in foreground mode, there is no modification to application update requests. When in background mode, however, the mobile device may take steps to reduce signaling load overhead and battery consumption by synchronizing application updates. For example, the mobile device may hold all socket creation requests until the next "wakeup" period. In another example, the mobile device may block or drop any socket connections during a "radio gate off" period. In another example, the mobile device's high-level operating system ("HLOS") may invoke registered applications when the device "wakes up" (i.e. enters foreground mode), permitting them to connect to the network. In another example, the HLOS may provide registered applications with a given update rate, requiring them to maintain their own update timer.

Figure 5:
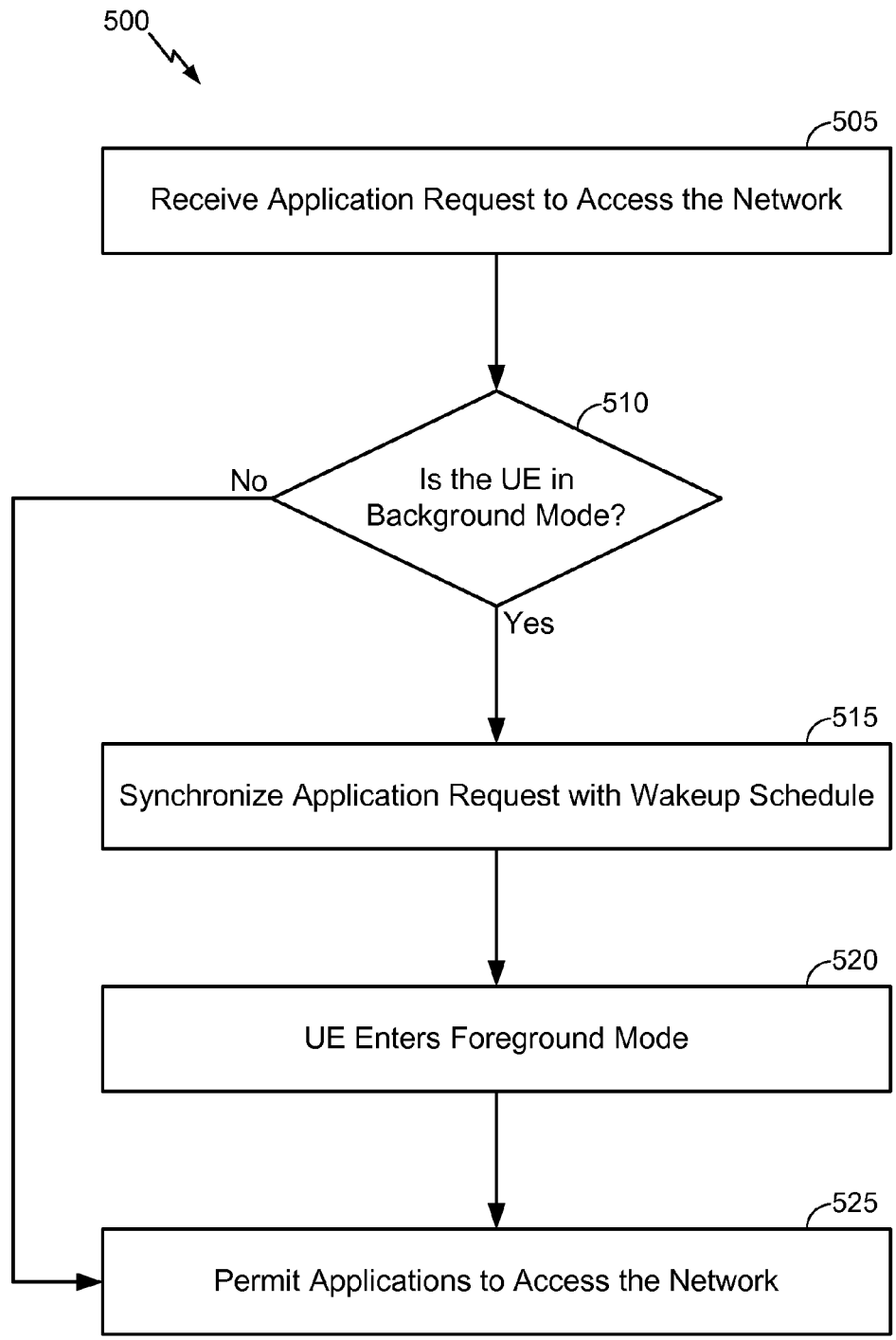
FIG. 5 illustrates a method according to an embodiment of the invention.

FIG. 5 illustrates a method 500 for optimizing signaling load overhead and battery consumption for background applications, according to an embodiment of the invention. In an exemplary embodiment of the invention, QUALCOMM'S® Connectivity Engine ("CnE") may implement method 500. Alternatively, any connectivity manager running on the mobile device, or the HLOS, may implement method 500.

Figure 6:
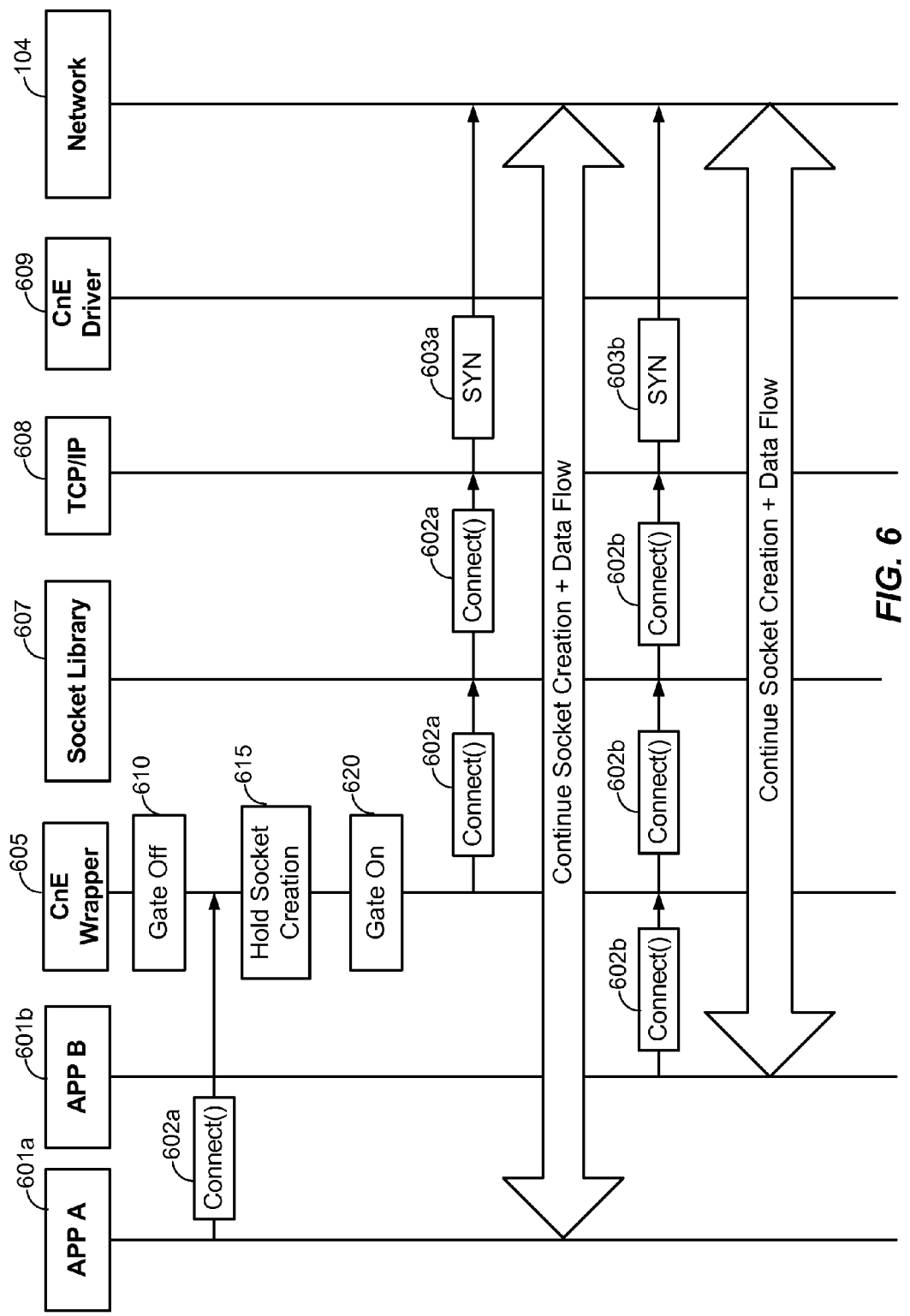
FIG. 6 illustrates an exemplary embodiment of the invention.
Figure 7:
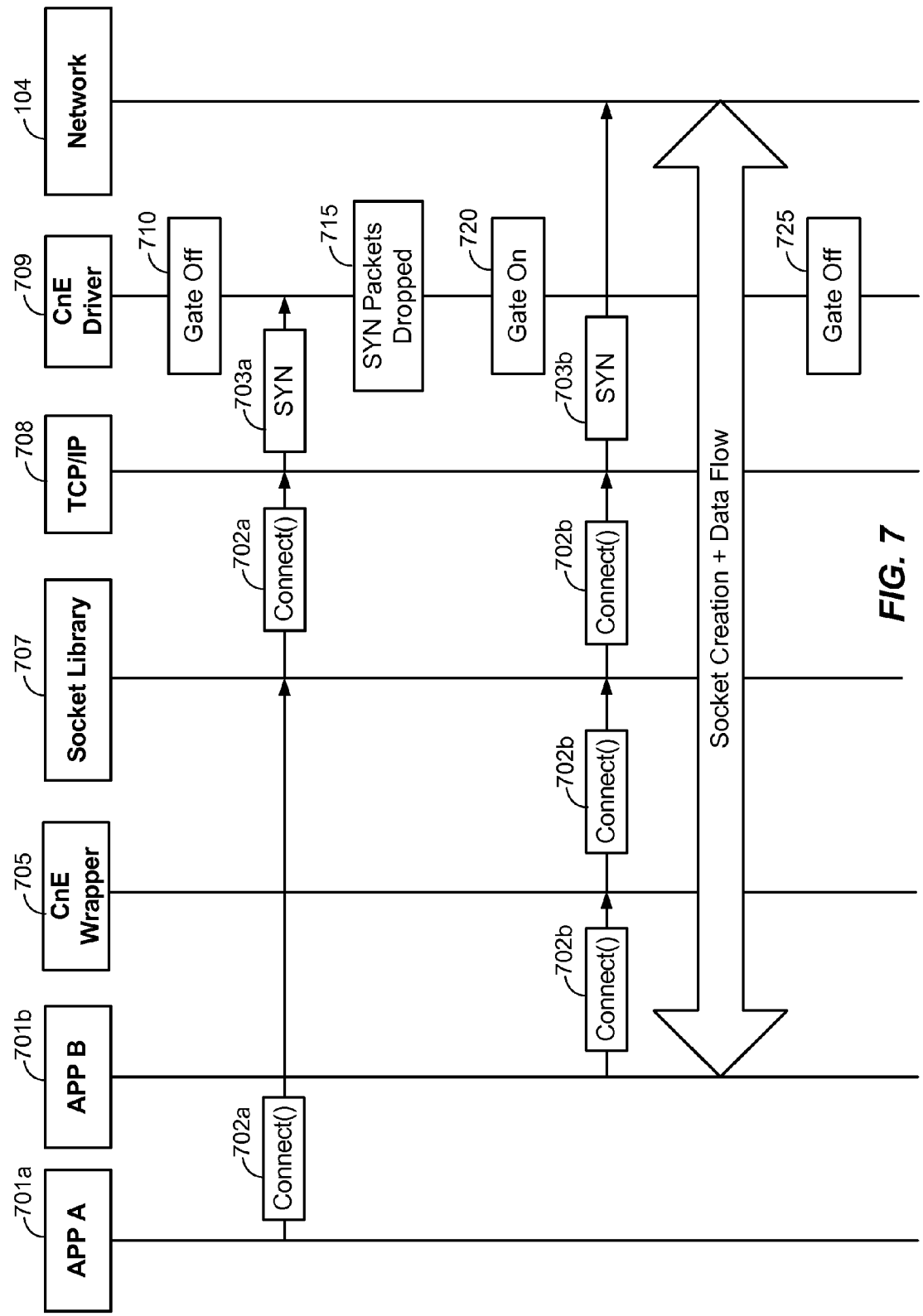
FIG. 7 illustrates an exemplary embodiment of the invention.
Figure 9:
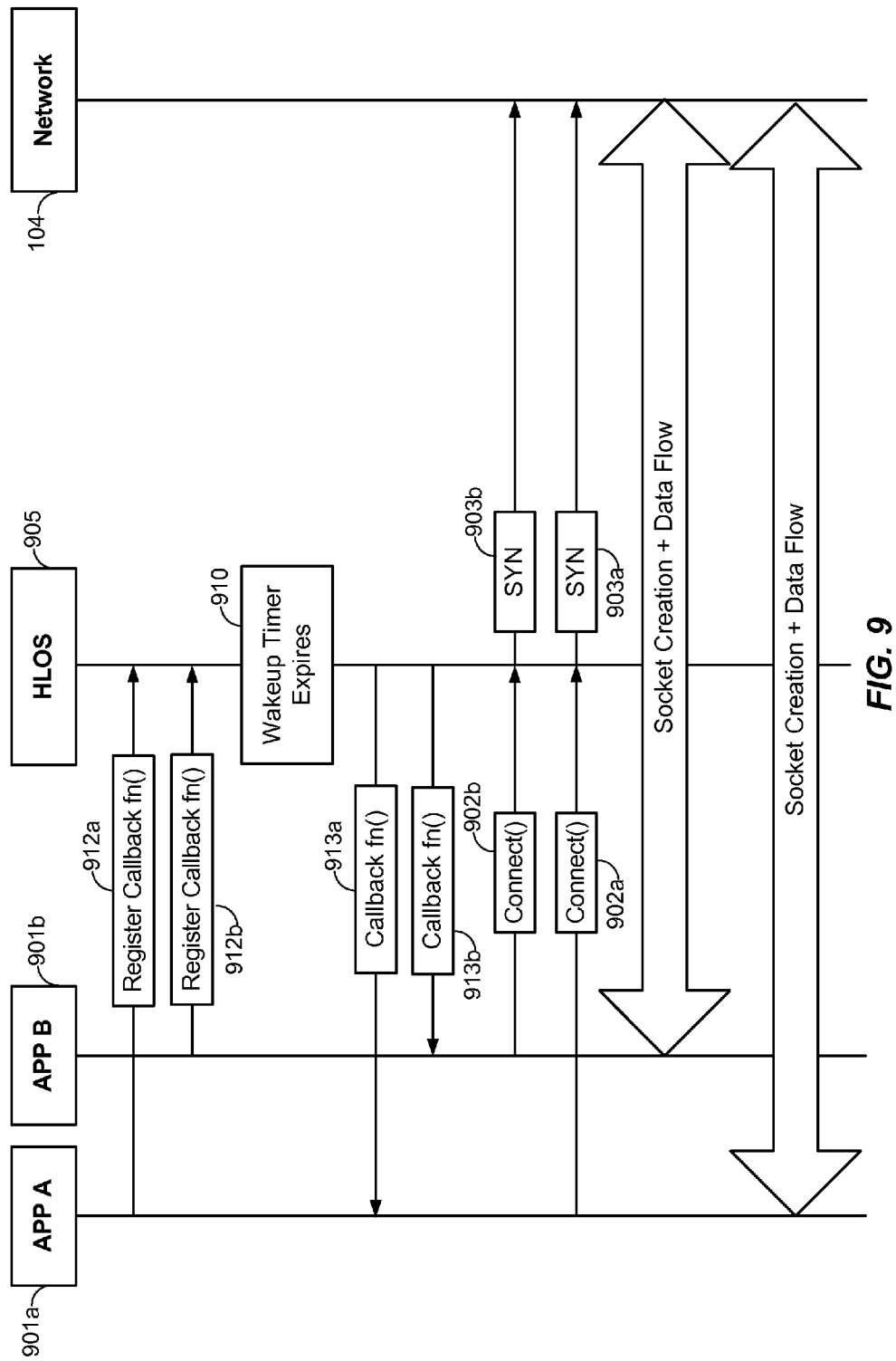
FIG. 9 illustrates an exemplary embodiment of the invention.

At 505, the mobile device receives a request from an application to access the network, such as an update request. For example, the request may be a request to open a socket (e.g. a Connect( ) method) as shown in FIG. 6. In another example, the request may be a synchronization request after a socket has been created (e.g. SYN packets) as shown in FIG. 7. In yet another example, the request may be a callback function registration as shown in FIG. 9.

At 510, the mobile device determines whether or not it is in background mode. As discussed above, when the mobile device determines that there has been no modem data activity for a predefined duration of time, no user interaction with the device for a predefined period of time, and the mobile device is not in "tethered" mode, it enters background mode. "Tethered" mode is when an external device connects to the mobile device either through a wireline or a wireless connection to use the mobile device's connectivity to the cellular operator as the backhaul. As an example of how the mobile device may determine that it is in background mode, the mobile device may set a "wakeup" timer when it enters background mode. When the wakeup timer expires, the device switches to foreground mode, as shown in FIG. 9. In that way, the wakeup timer defines the period of time the mobile device will spend in background mode. If the mobile device "wakes up" before the expiration of the wakeup timer, due to user input or network activity, for example, the mobile device may stop the timer then reset it when it returns to background mode. Thus, in order to determine whether or not the mobile device is in background mode, the mobile device may simply check whether or not the wakeup timer is still running. When the mobile device wakes up, the mobile device processes the queued requests and forwards them to the network.

In another example, the mobile device may additionally or alternatively define a radio "gate on/off" period, as shown in FIGS. 6 and 7. The radio gate is "on" when the mobile device is in foreground mode and "off" when the mobile device is in background mode. The mobile device may define a particular period of time that the radio gate should be off. The mobile device can check whether the gate is "on" or "off" in order to determine whether the mobile device is in background mode. If the mobile device is not in background mode, the mobile device permits the application to access the network at 525.

At 515, if the mobile device is in background mode, the mobile device synchronizes the application request with a predefined wakeup schedule. For example, the mobile device may hold all socket open requests until the mobile device enters foreground mode at the beginning of a "gate on" period, as shown in FIG. 6, or the expiration of the wakeup timer. In another example, the mobile device may block or drop all socket connections while the device is in background mode, i.e. during a "gate off" period as shown in FIG. 7, or until the expiration of the wakeup timer. In another example, the mobile device may register the callback function received from the application, as shown in FIG. 9. In this example, the mobile device may register the callback function before or after determining that it is in background mode.

At 520, the mobile device "wakes up" and enters foreground mode. The mobile device may wake up due to the expiration of the wakeup timer or due to user or network activity. Upon entering foreground mode, the mobile device may stop the wakeup timer (if not expired) and/or set the radio gate to "on."

At 525, the mobile device permits any application to access the network. For example, the mobile device may release the socket open requests it had been holding, as shown in FIG. 6. In another example, the mobile device may stop blocking or dropping socket connections, as shown in FIG. 7. In another example, the mobile device may invoke the applications that registered callback functions, as shown in FIG. 9. The mobile device permits all network access requests during the foreground period. At the expiration of the foreground period, or due to inactivity, the mobile device reenters background mode, and method 500 may repeat.

FIG. 6 illustrates an exemplary embodiment of the invention whereby the mobile device holds all socket open requests until the mobile device enters foreground mode. FIG. 6 shows QUALCOMM'S® CnE wrapper 605 controlling access requests from various applications A and B (601a and 601b, respectively), but it will be apparent that any connectivity manager could perform the function of the CnE wrapper 605.

In FIG. 6, the CnE wrapper 605 initially sets a "gate off" period 610 (the CnE wrapper 605 may also, or alternatively, start a wakeup timer, as discussed above). This "gate off" period 610 corresponds to the mobile device being in background mode. During the "gate off" period 610, the CnE wrapper 605 intercepts all socket open requests, e.g. Connect( ) methods 602a, and holds (615) them until the mobile device "wakes up" (i.e. enters the foreground mode) and transitions to a "gate on" period 620. The start of the "gate on" period 620 may be due to the expiration of the wakeup timer or due to user or network initiated data. During the "gate on" period 620, the CnE wrapper 605 passes any socket open requests (e.g. 602b), including the socket requests that it had been holding (e.g. 602a), to the socket library 607 and TCP/IP stack. The TCP/IP layer 608 then transmits the requests (now, e.g., SYN requests 603a and 603b) to the network 104, without further involving the CnE driver 609.

The CnE wrapper 605 may "hold" the socket open requests 602a at 615 by, for example, freezing the application threads. Then, when the mobile device enters foreground mode, i.e. the "gate on" period 620, the CnE wrapper 605 releases the application threads so that they may continue executing.

FIG. 7 illustrates an exemplary embodiment of the invention whereby the mobile device drops socket connections during a "radio gate off" period. FIG. 7 shows QUALCOMM'S® CnE driver 709 controlling access requests from various applications A and B (701a and 701b, respectively), but it will be apparent that any connectivity manager could perform the function of the CnE driver 709.

In FIG. 7, the CnE driver 709 initially sets a "gate off" period 710 (the CnE wrapper 705 may also, or alternatively, start a wakeup timer, as discussed above). This "gate off" period 710 corresponds to the mobile device being in background mode. The CnE driver 709 intercepts outgoing synchronization packets, e.g. SYN requests 703a from Connect( ) 702a, and drops them (715), but forwards any other type of packet (leading to a radio connection being established). When the mobile device "wakes up," whether because the "gate off" period 710 expired or it was interrupted by user or network initiated data, the CnE driver 709 transitions to a "gate on" period 720, i.e. foreground mode. All packets received during the "gate on" period 720, such as SYN request 703b from Connect( ) 702b, pass through CnE wrapper 705, socket library 707, TCP/IP 708, and are forwarded to the network 104. Any synchronization packets received during the "gate off" period 710, however, are not forwarded. The CnE driver 709 sets another "gate off" period at 725.

Figure 8:
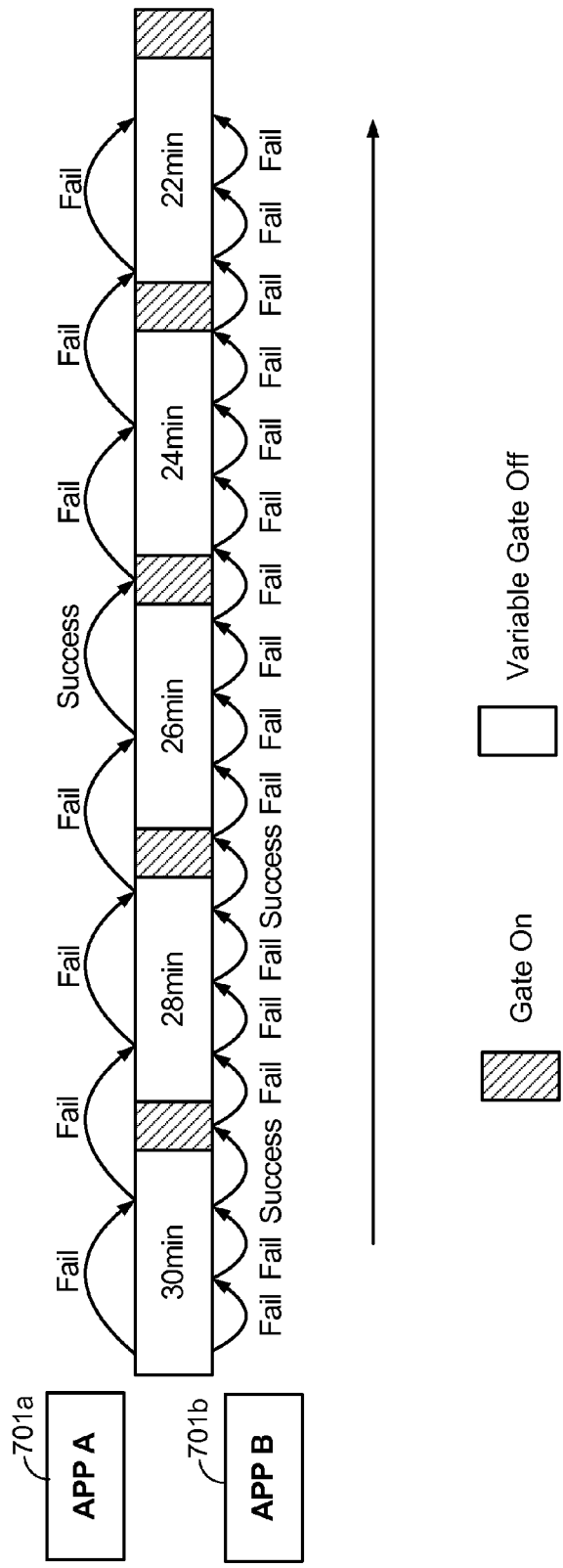
FIG. 8 illustrates an exemplary timeline of an embodiment of the invention.

As shown in FIG. 8, the "gate off" period 710 or wakeup timer in FIG. 7 may be modified after every wakeup cycle to ensure the successful update, over time, of all applications. That is, only a fraction of the application-initiated updates will be successful during a given "gate off" period 710. For example, with the 30 minute "gate off" period shown in FIG. 8, application A 701a fails to update but application B 701b succeeds at the next wakeup. The result is the same for the 28 minute "gate off" period. However, after the 26 minute "gate off" period, application A 701a successfully updates, while application B 701b fails to update. The mobile device can continue changing the "gate off" period until an optimal period is determined. Although FIG. 8 shows decreasing "gate off" intervals, it will be apparent that increasing intervals are also possible. The timing is chosen in such a way that over a large time period, all the applications will be able to transmit the data. The choice of the gate-on/gate-off period may be derived based on the timing periodicity registered by different applications.

FIG. 9 illustrates an embodiment of the invention whereby the HLOS 905 invokes registered applications and permits them to connect to the network upon the expiration of a wakeup timer. Exemplary applications A and B (901a and 901b, respectively) register callback functions 912a and 912b with the HLOS 905. At some point, the HLOS 905 determines that a wakeup timer has expired (910) and enters the foreground mode. Upon entering the foreground mode, the HLOS 905 invokes applications A and B, 901a and 901b, by means of the registered callback functions 913a and 913b, respectively. The applications then perform update operations, e.g. sending Connect( ) functions 902a and 902b to the HLOS 905, which sends SYN requests 903a and 903b to the network 104.

Figure 10:
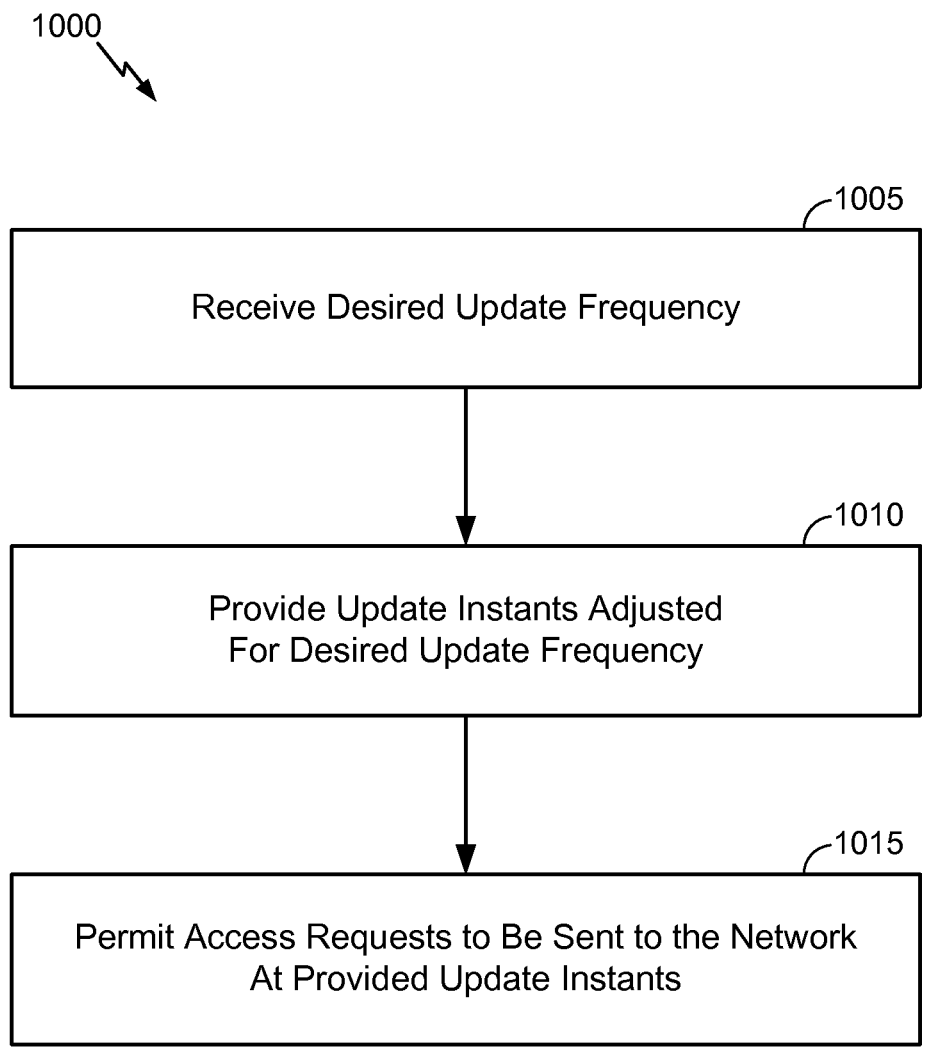
FIG. 10 illustrates a method according to an embodiment of the invention.

FIG. 10 illustrates a method 1000 according to an embodiment of the invention whereby a registered application maintains an update timer and updates according to an HLOS-provided update rate. At 1005, an application registers with the HLOS and requests a desired update frequency. At 1010, the HLOS provides the application with its update instants (e.g. update time and frequency). All applications are provided the same update instants adjusted for their desired update frequency. That is, all applications are given the same update time and frequency unless certain applications do not need to update that frequently. For example, a given application may request to update every 12 hours, while the HLOS has determined that all applications should update every two hours. In that situation, the given application would be given an update instant of every 12 hours. On the other hand, if a given application requests to update every hour and the HLOS has determined that all applications should update every two hours, that application will be given an update instant of every two hours. Further, all applications will update at the same time every two hours. For example, the HLOS may determine that each application should update at 12:00 pm, 2:00 pm, 4:00 pm, and so on. Each registered application maintains its own update timer, and at the specified update instants, each application sends update requests to the network (1015).

Figure 11:
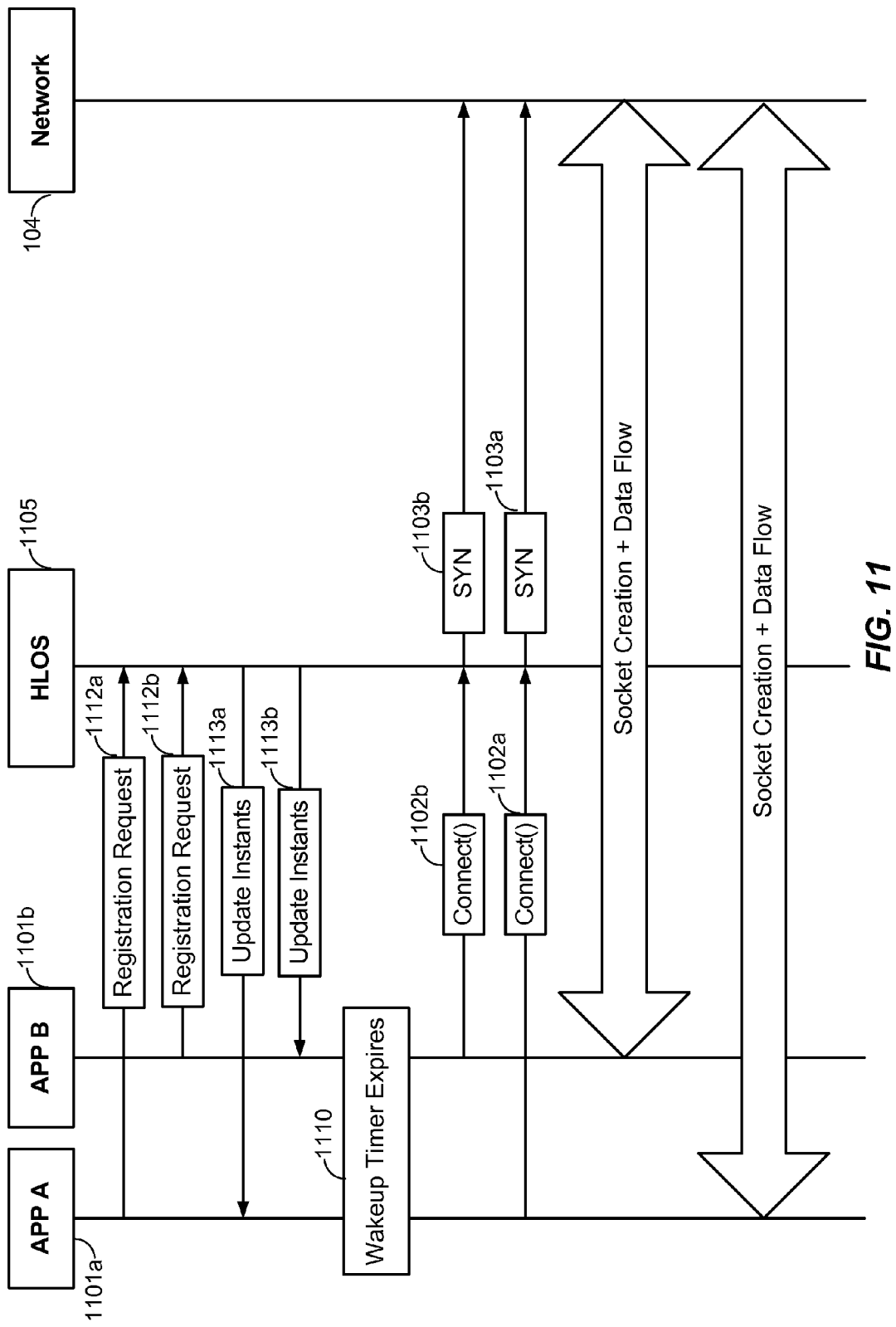
FIG. 11 illustrates an exemplary embodiment of the invention.

FIG. 11 illustrates an example embodiment of the invention whereby an application registers with the HLOS 1105 and is given a particular update rate. Specifically, applications A and B (1101a and 1101b, respectively) send registration requests 1112a and 1112b to the HLOS 1105. In response, the HLOS 1105 sends applications A and B their respective update instants 1113a and 1113b. As described above with respect to FIG. 10, the update instants for applications A and B may be the same. Applications A and B then set their own wakeup timers to the provided update instants. When the wakeup timers expire at 1110, applications A and B send update requests (e.g. Connect( ) functions 1102a and 1102b) to the HLOS 1105. The HLOS 1105 receives the update requests and transmits them to the network (e.g. as SYN requests 1103a and 1103b).

FIGS. 12-15 show the results of testing various embodiments of the invention. Embodiments of the invention were tested on a Smartphone accessing a commercial EV-DO network. The applications tested were an SMS blogging service application, a finance application, and a news feed application, with a preferred refresh rate of every five minutes, a social media application and a weather application, with a preferred refresh rate of every hour, and a voice-over-IP (VoIP) text messaging application and instant messaging application, with variable refresh rates. The test duration was one hour. The network dormancy timer was four seconds. The metrics tracked were the total number of connections, the total connected time, and the average connection duration.

Table 1 below shows four test cases run without using an embodiment of the invention in order to set a baseline. Test Case 1 ran the SMS blogging service application, the social media application, and the VoIP text messaging application. Test Case 2 ran the Test Case 1 applications plus the finance application and the weather application. Test Case 3 ran the Test Case 2 applications plus the news feed application. Test Case 4 ran the Test Case 2 applications plus the instant messaging application.

TABLE 1

| Test Case | Total Connection Time (sec) | Number of Connections | Average Connection Time (sec) |
|---|---|---|---|
| 1 | 279.2 | 35 | 7.9 |
| 2 | 338.8 | 43 | 7.8 |
| 3 | 402.8 | 55 | 7.3 |
| 4 | 422.8 | 61 | 6.9 |

As discussed above, embodiments of the invention time-align the connections for background applications. For testing embodiments of the invention, the relevant factors were the number of applications, the percentage of time that the mobile device was actively used, the relative power consumption of active device usage (i.e. foreground mode) versus updates to the same set of applications when in the background (i.e. background mode), and the time-alignment of updates to applications in background mode.

Figure 12:
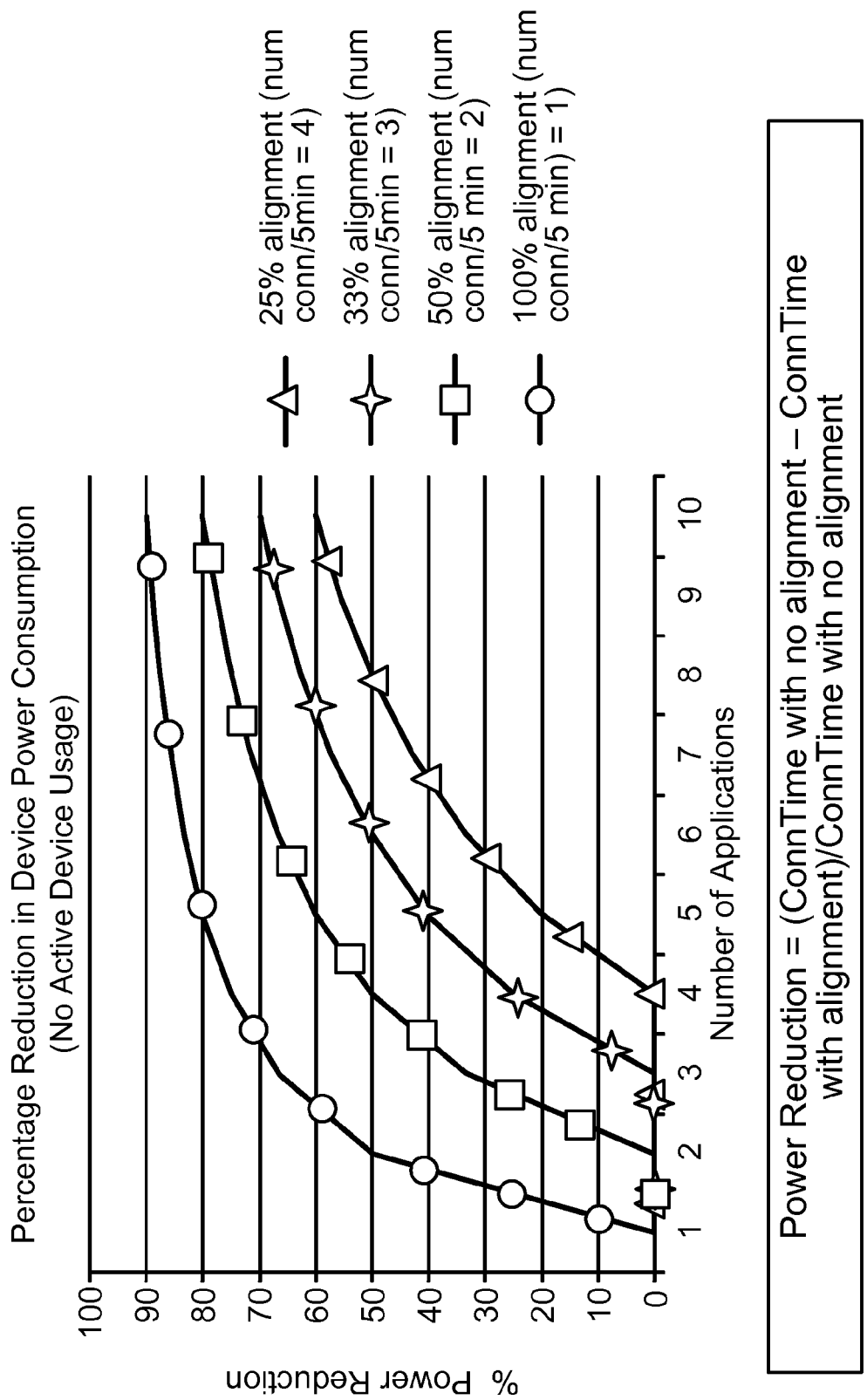
FIG. 12 illustrates test results of an embodiment of the invention.
Figure 13:
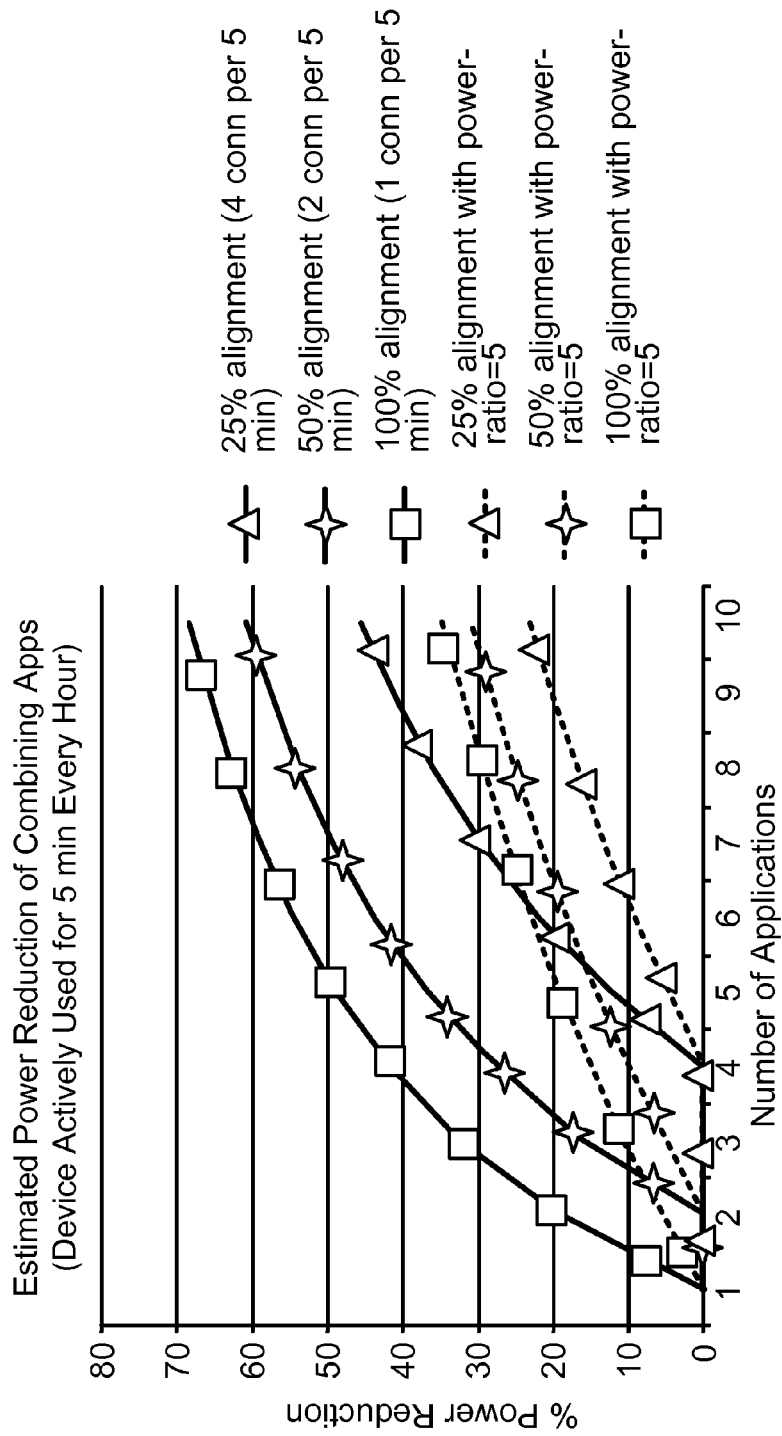
FIG. 13 illustrates test results of an embodiment of the invention.

FIG. 12 illustrates the percentage reduction in device power consumption when there was no active device usage. FIG. 13 illustrates the estimated power reduction of combining applications when the device was actively used for five minutes every hour.

Other tests of embodiments of the invention determined the foreground-to-background power consumption ratio. The assumption to be verified was that power consumption during foreground mode was not a strong function of the application used. Running the SMS blogging service application, the social media application, and the finance application in background mode, the average current draw was 320 mA during data activity and approximately 0 mA when there was no data activity. Running a web browser application during foreground mode, the average current draw was 780 mA during data activity and approximately 200 mA when there was no data activity. Thus, the foreground mode to background mode power consumption ratio is approximately 2.5.

Figure 14:
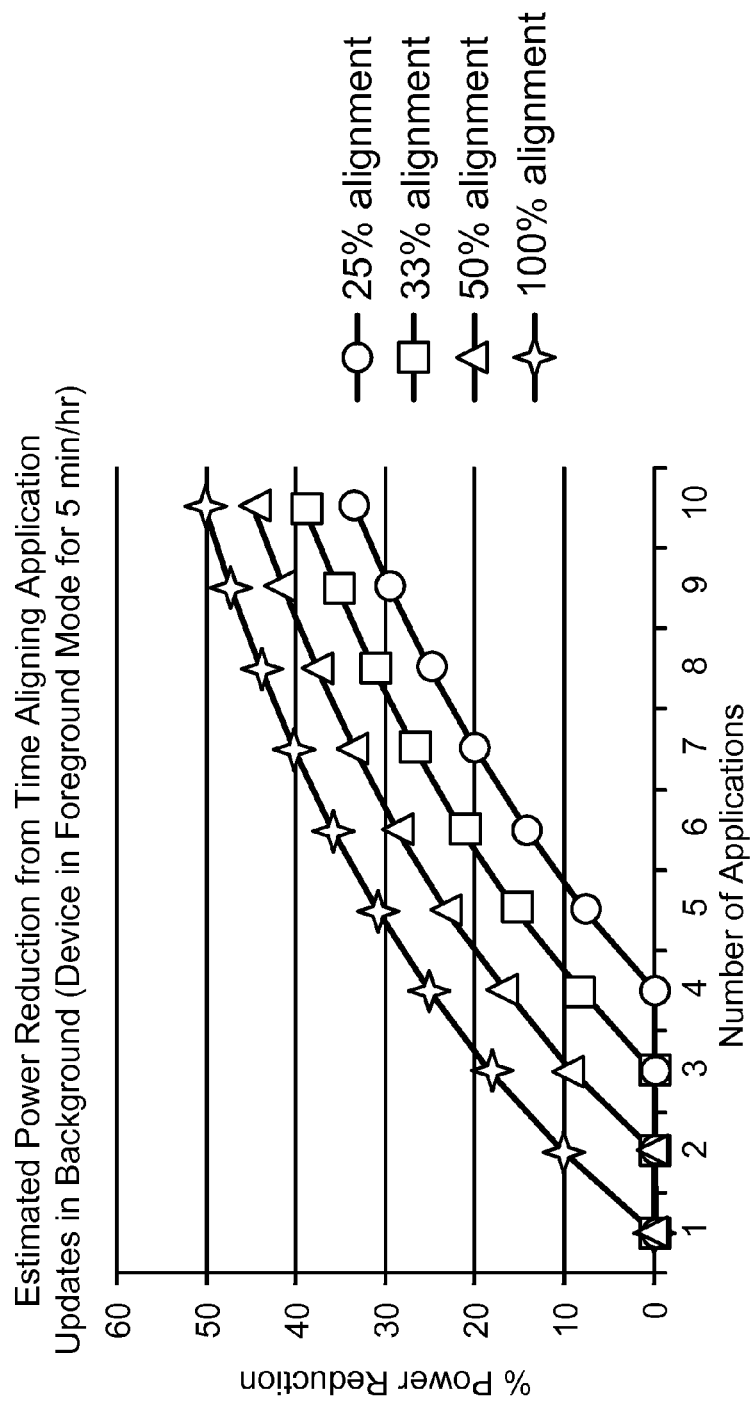
FIG. 14 illustrates test results of an embodiment of the invention.
Figure 15:
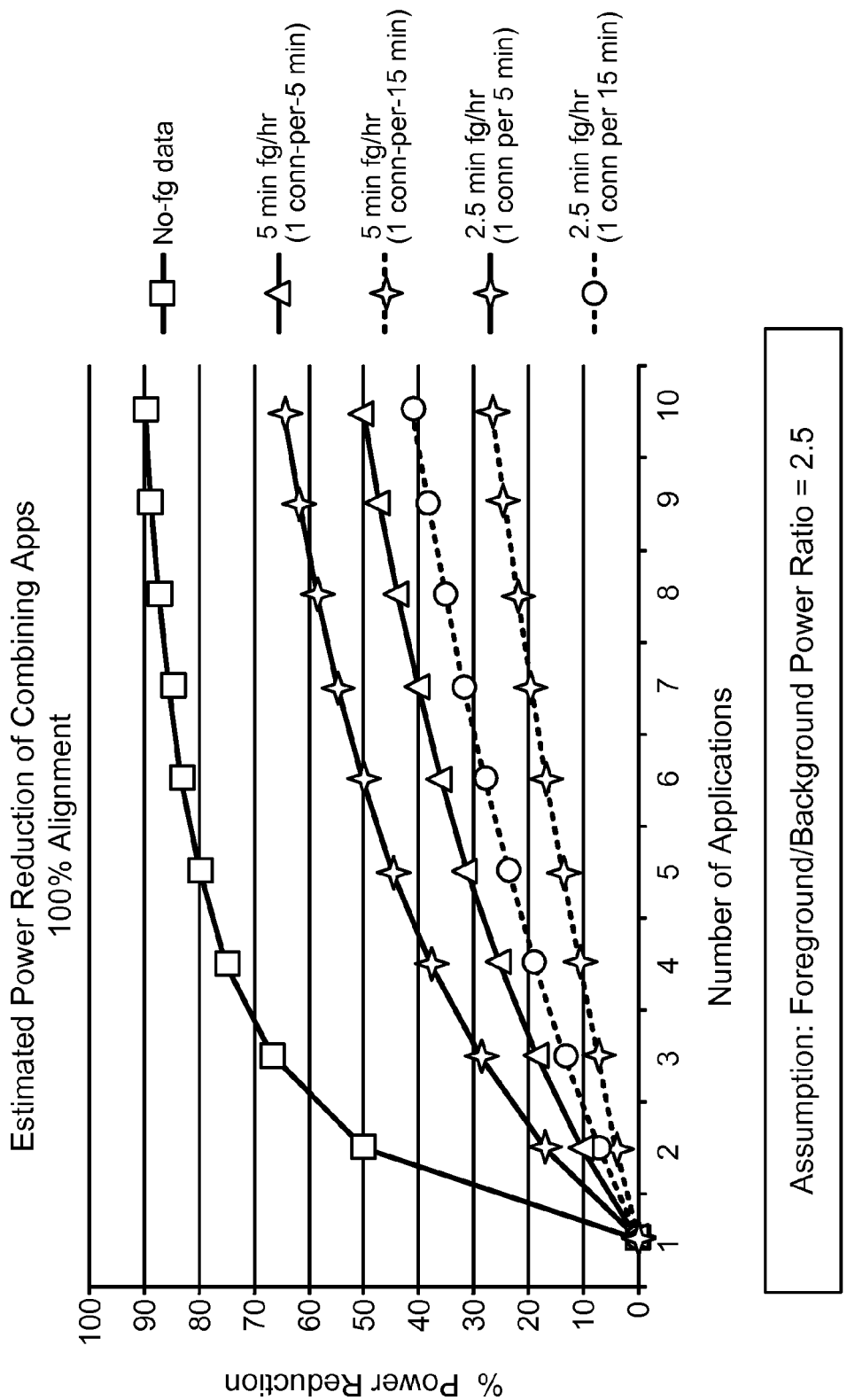
FIG. 15 illustrates test results of an embodiment of the invention.

FIG. 14 illustrates the estimated power reduction from time aligning application updates in background mode, assuming the mobile device is in foreground mode for five minutes per hour and the foreground-to-background power ratio is 2.5. FIG. 15 illustrates the estimated power reduction of combining applications at 100% alignment, again assuming that the foreground-to-background power ratio is 2.5.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for optimizing signaling load overhead and battery consumption for background applications. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for managing applications configured for execution on a mobile device, comprising:
    receiving one or more network access requests from one or more applications executing on the mobile device;
    determining that the mobile device is operating in a background mode;
    suppressing transmission to a network of the one or more network access requests based on the determination; and
    transmitting a subset of the one or more network access requests upon transition out of the background mode.

2. The method of claim 1, wherein the determining comprises:
    starting a timer when the mobile device enters the background mode;
    determining whether the timer is still running; and
    if the timer is still running, determining that the mobile device is in the background mode.

3. The method of claim 2, wherein the timer defines a period of time the mobile device will be in the background mode.

4. The method of claim 2, wherein the mobile device enters a foreground mode when the timer expires.

5. The method of claim 1, wherein the determining comprises:
    setting a gate on/off period indicating whether the mobile device is operating in the background mode; and
    if the gate is set to "off," determining that the mobile device is operating in the background mode.

6. The method of claim 5, wherein the gate off period defines a period of time that the mobile device will be in the background mode.

7. The method of claim 1, wherein the mobile device is not operating in the background mode when at least one of the following conditions is met:
    a modem of the mobile device is in a connected mode;
    a display of the mobile device is on;

there has been a key-press within a first predefined time period;

a GPS-based location service actively updated within a second predefined time period;

at least one short message service (SMS) message was received within a predefined time period;

a speaker and/or microphone of the mobile device was on and the modem was in the connected mode within a third predefined time period; or a camera of the mobile device is on.

8. The method of claim 1, wherein the suppressing comprises:

holding the one or more network access requests until the mobile device enters a foreground mode.

9. The method of claim 8, wherein the holding comprises:
freezing one or more execution threads associated with the one or more applications.

10. The method of claim 8, wherein the one or more network access requests comprise one or more requests to open one or more sockets.

11. The method of claim 1, wherein the suppressing comprises:

dropping the one or more network access requests.

12. The method of claim 11, wherein the one or more network access requests comprise one or more socket connections.

13. The method of claim 1, wherein the suppressing comprises:

registering the one or more applications; and
invoking the one or more applications when the mobile device enters a foreground mode.

14. The method of claim 13, wherein the one or more network access requests comprise one or more callback functions from the one or more applications.

15. The method of claim 1, wherein the suppressing comprises:

providing an update time and frequency to each of the one or more applications based on the one or more network access requests.

16. The method of claim 15, wherein the one or more network access requests comprise one or more registration requests from the one or more applications.

17. The method of claim 16, wherein the one or more registration requests include a preferred update frequency of the one or more applications.

18. The method of claim 1, wherein the one or more network access requests comprise one or more synchronization requests.

19. The method of claim 1, further comprising:

entering a foreground mode of operating the mobile device.

20. The method of claim 19, wherein the entering comprises:

determining that a background mode timer has expired; and
entering the foreground mode in response to the background mode timer expiring.

21. The method of claim 19, wherein the entering comprises:

determining that the mobile device has received user input; and
entering the foreground mode in response to the user input.

22. The method of claim 19, wherein the entering comprises:

determining that the mobile device has received network initiated data; and
entering the foreground mode in response to receiving the network initiated data.

23. The method of claim 1, wherein the transmitting comprises:

permitting the subset of the one or more applications to make one or more socket connections.

24. The method of claim 1, wherein the transmitting comprises:

unfreezing one or more execution threads associated with the one or more applications.

25. The method of claim 1, wherein the transmitting comprises:

invoking the one or more applications through one or more callback functions.

26. The method of claim 1, wherein the mobile device enters the background mode when:

there has been no modem data activity for a first predefined duration of time;
there has been no user interaction for a second predefined duration of time; and
the mobile device is not in a tethered mode.

27. An apparatus for managing applications configured for execution on a mobile device, comprising:

a connectivity manager configured to receive one or more network access requests from one or more applications executing on the mobile device, to determine that the mobile device is operating in a background mode, and to suppress transmission to a network of the one or more network access requests based on the determination; and
a transmitter configured to transmit a subset of the one or more network access requests upon transition out of the background mode.

28. An apparatus for managing applications configured for execution on a mobile device, comprising:

means for receiving one or more network access requests from one or more applications executing on the mobile device;
means for determining that the mobile device is operating in a background mode;
means for suppressing transmission to a network of the one or more network access requests based on the determination; and
means for transmitting a subset of the one or more network access requests upon transition out of the background mode.

29. A non-transitory computer-readable medium for managing applications configured for execution on a mobile device, comprising:

at least one instruction to receive one or more network access requests from one or more applications executing on the mobile device;
at least one instruction to determine that the mobile device is operating in a background mode;
at least one instruction to suppress transmission to a network of the one or more network access requests based on the determination; and
at least one instruction to transmit a subset of the one or more network access requests upon transition out of the background mode.

* * * * *